(12) United States Patent
Wu (10) Patent No.: US 7,483,798 B2
(45) Date of Patent: Jan. 27, 2009

(54) REAL-TIME HIGH-SPEED MONITORING OF STEADY STATE

(75) Inventor: Keng C. Wu, Cranbury, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 94 days.

(21) Appl. No.: 11/787,331

(22) Filed: Apr. 16, 2007

(65) Prior Publication Data

US 2008/0255802 A1 Oct. 16, 2008

(51) Int. Cl.
*H02M 7/217* (2006.01)
*G01R 19/00* (2006.01)

(52) U.S. Cl. ......................................................... 702/64
(58) Field of Classification Search ..................... 702/64
See application file for complete search history.

(56) References Cited

U.S. PATENT DOCUMENTS 4,918,643 A * 4/1990 Wong ............................. 703/4
6,367,024 B1 * 4/2002 Ezell ........................... 713/340
2003/0128563 A1 * 7/2003 Rojas Romero .............. 363/89

\* cited by examiner

*Primary Examiner*—Michael P. Nghiem
*Assistant Examiner*—Cindy H Khuu
(74) *Attorney, Agent, or Firm*—Duane Morris LLP (57) ABSTRACT

A method for predicting a steady state performance of a switched circuit. The method includes: identifying a plurality of circuit components; determining a transition matrix for the first and a second state; defining a first and a second state sourcing matrixes; defining a first and a second energy input matrixes, the first energy input matrix defining energy input to the switched system during state 1 and the second energy input matrix defining energy input to the switched system during state 2; defining a first and a second state equations as a function of dwell time in the first state and as a function of the component matrixes, the state response matrixes and the energy input matrixes for each of the first and the second states; and predicting the steady state performance of the switched circuit as a function of the first state and the second state equations.

27 Claims, 8 Drawing Sheets

REAL-TIME HIGH-SPEED MONITORING OF STEADY STATE

BACKGROUND

Switched networks and multi-state devices are commonly used in various electronic applications. Such networks include, for example, rectifiers, AC/DC converter and DC/AC inverters. The design and optimization of the non-linear switching systems require extensive mathematical modeling. In designing such a process model, it is highly desirable to be able to acquire and to understand the steady-state performance for the network in advance.

For example, the steady-state output ripple voltage is a key parameter in evaluating the performance of a switching inverter. In order to obtain such information scientists and engineers conventionally resort to conventional simulation and modeling software. The conventional models offer a few data points and do not provide a high degree of confidence. Other disadvantages include extensive simulation time, possible model failure and uncertainty about the steady-state of the system.

Because the conventional simulations start from the so-called zero state, passing through a transient initial states can be very time-consuming. Indeed, the model can spend upward of several hours passing through the transient phase from the initial zero state. In addition, conventional simulations rely on differential equations that must converge at the boundary which separates two sequential states. As a result, these simulations often fail because of the complexity attributed to the unpredictable boundary conditions and the complexity of solving multiple differential equations. Finally, the conventional simulations do not detect and cannot predict when the steady state is reached.

SUMMARY OF THE DISCLOSURE

The disclosure generally relates to a method and apparatus for real-time high speed monitoring of switching systems. In one embodiment, the disclosure relates to a method for predicting a steady state performance of a switched circuit having a first state and a second state, the method comprising: identifying a plurality of circuit components, each circuit component having at least one component parameter; determining a transition matrix $[A_1]$ for the first state and a transition matrix $[A_2]$ for the second state; defining a first state sourcing matrix $[B_1]$ and a second state sourcing matrix $[B_2]$; defining a first energy input matrix $[E_1]$ and a second energy input matrix $[E_2]$, the first energy input matrix $[E_1]$ defining energy input to the switched system during state 1 and the second energy input matrix $[E_2]$ defining energy input to the switched system during state 2; defining a first state equation and a second state equation as a function of a dwell time in the first state and as a function of the transition matrixes, the sourcing matrixes and the energy input matrixes for each of the first and the second states; and predicting the steady state performance of the switched circuit as a function of the first state and the second state equations.

In another embodiment, the disclosure relates to an apparatus for predicting a steady state performance of a multi-state switched device, comprising a circuitry having at least one microprocessor and a memory in communication with said microprocessor. The memory can store instructions directing the microprocessor to: identify a plurality of circuit components of the multi-state switched device, each component having at least one parameter; determine a transition matrix for a first state $[A_1]$ and a transition matrix $[A_2]$ for the second state; define a first state sourcing matrix $[B_1]$ and a second state sourcing matrix $[B_2]$; define a first energy input matrix $[E_1]$ and a second energy input matrix $[E_2]$, the first energy input matrix $[E_1]$ defining energy input to the switched device during the first state and the second energy input matrix $[E_2]$ defining energy input to the switched device during the second state; determine a first state equation and a second state equation as a function of a dwell time in the first state; and predict the steady state performance for the switched device as a function of the first state and the second state equations.

In another embodiment, the disclosure relates to a firmware for predicting steady state performance of a multi-state switched device, comprising a microprocessor programmed with a set of instructions to: identify a plurality of circuit components of the multi-state switched device, each component having at least one parameter; determine a transition matrix for a first state $[A_1]$ and a transition matrix $[A_2]$ for the second state; define a first state sourcing matrix $[B_1]$ and a second state sourcing matrix $[B_2]$; define a first energy input matrix $[E_1]$ and a second energy input matrix $[E_2]$, the first energy input matrix $[E_1]$ defining energy input to the switched device during the first state and the second energy input matrix $[E_2]$ defining energy input to the switched device during the second state; determine a first state equation and a second state equation as a function of a dwell time in the first state; and predict the steady state performance for the switched device as a function of the first state and the second state equations without regard to a transition state between the first and the second states.

DETAILED DESCRIPTION

The disclosure generally relates to a method and apparatus for real-time monitoring of non-linear switching systems. While the novel principles are disclosed in relation to a two-state system, it is understood that the disclosure is not limited to such systems and the disclosed principles can be applied to multi-state systems having more than two-states.

Figure 1A:
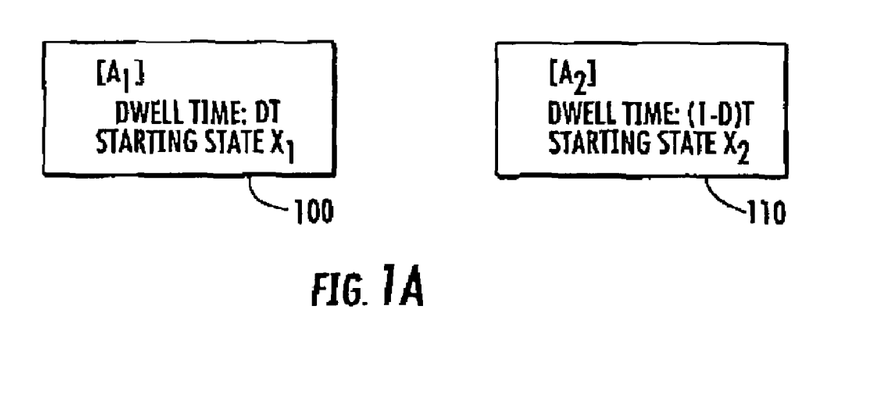
FIG. 1A is a schematic illustration of a flow diagram for a two-state system.

FIG. 1A is a schematic illustration of a flow diagram for a two-state switching system. Under the control of an algorithm according to one embodiment, a dynamic system alternates cyclically between the two states. In FIG. 1, box 100 represents the first state and box 110 represents the second state of an exemplary non-linear switching system. At the first state, the system can be defined by component parameters $A_1$, which can be a matrix. Similarly, the component parameters of the second state are represented by $A_2$, which can also be a matrix. Dwell time for the first state 100 is identified as DT. Since the system has only two states, it follows that the dwell time of the second state is (1-D)T. Finally, each structure has its corresponding starting states, $X_1$ for [$A_1$] and $X_2$ for $A_2$.

Figure 1B:
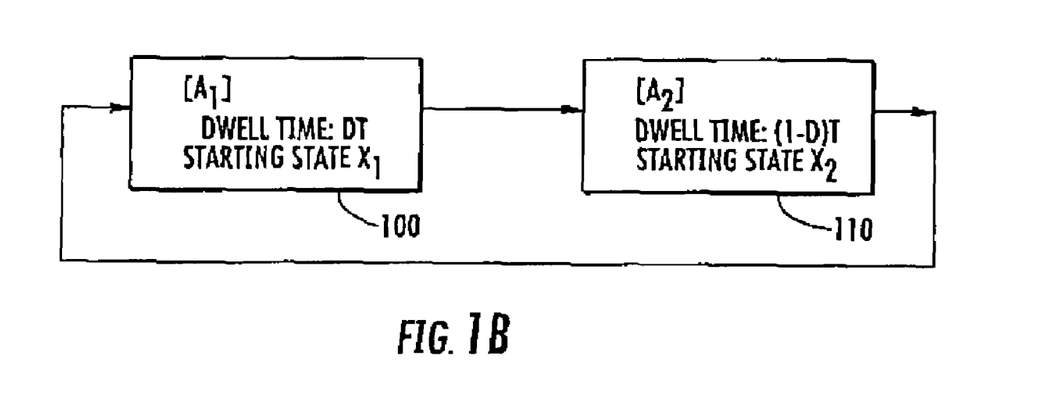
FIG. 1B is a schematic illustration of a flow diagram for a two-state system during operation.

When the system is operating in a steady state, both starting states are intimately linked. FIG. 1B is a schematic illustration of a flow diagram for a two-state system during operation. That is, at the end of dwell time DT, $X_1$ propagates to $X_2$. By the same token, at the end of dwell time (1-D)T, $X_2$ returns to $X_1$, and the cycle repeats. This unique steady state property holds for all dynamic systems that have stable states at certain times and can define starting states $X_1$ and $X_2$ in terms of component parameter matrixes [$A_1$] and [$A_2$]. According to one embodiment of the disclosure, once the starting states are known, the periodic steady-state behavior of the systems can be expressed without regard to the transient phase or convergence from the starting state.

Figure 2:
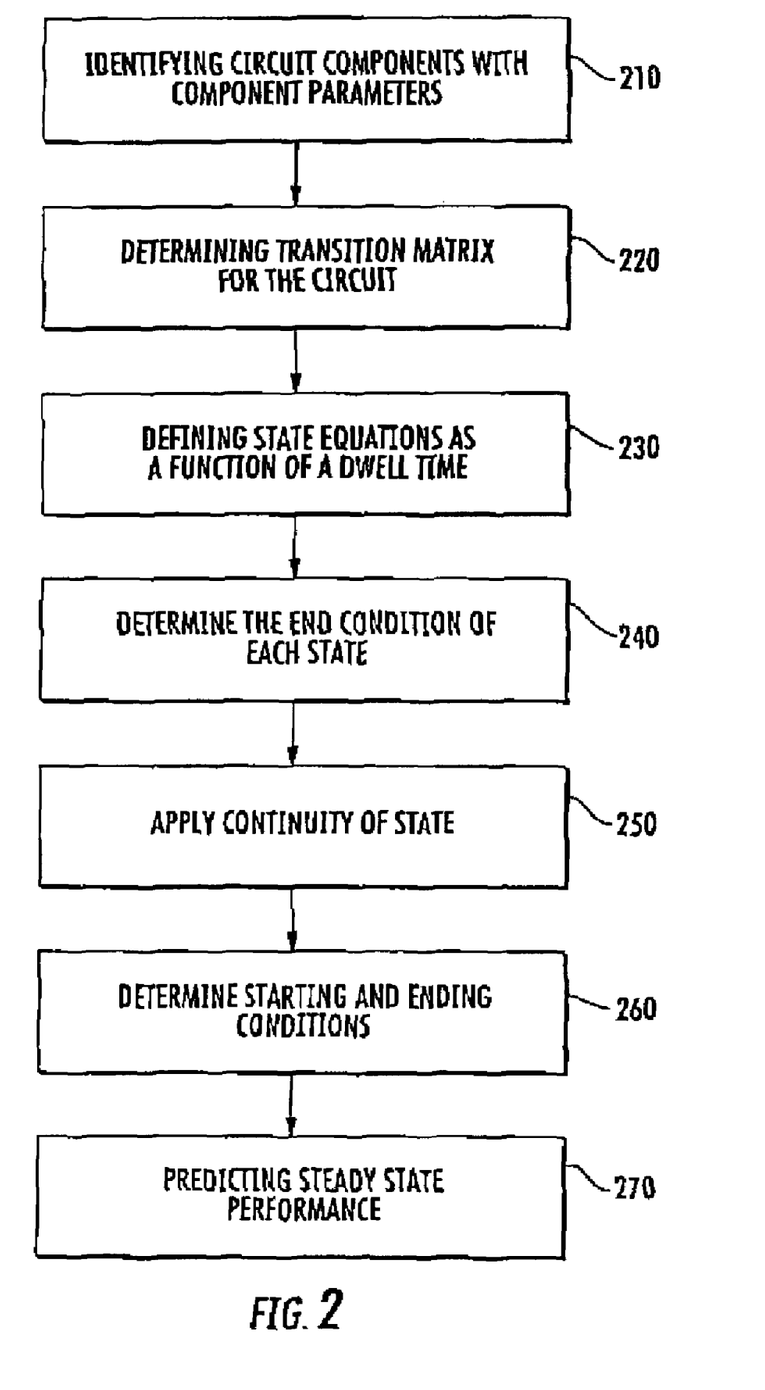
FIG. 2 is an exemplary algorithm according to one embodiment of the disclosure.

FIG. 2 is an exemplary algorithm according to one embodiment of the disclosure. The algorithm of FIG. 2 can be implemented, for example, as a firmware or as a software directing operation of hardware. In step 210, the algorithm starts by identifying circuit components having non-linear parameters. The circuit components may include, for example, capacitors, transistors and inductors. The circuit components may be known in advanced and accorded to a computer program defining an embodiment of the disclosure. An operator can manually identify each circuit component and its parameters or the same can be imported from an existing file.

Step 220 is directed to determining the transition matrix for the circuit during each state. Thus, for a two-state circuit, there can be two matrixes each defining the circuit behavior at one state. The transition matrixes may represent the circuit dynamics responding to the starting condition at each state. Step 230 defines the state equations as a function of the dwell time. The dwell time is the time the circuit is governed by each state. The dwell time may include ramp-up time. For a circuit having two states, step 203 may include defining a first and a second state equations as a function of dwell time in each state. Each of the first and the second state equations can be defined as a function of transition matrixes and circuitry components.

In step 240, the process seeks to determine the end condition for each state as a function of a starting condition for the subsequent state. In one embodiment, the end condition of each state corresponding to a given starting condition is obtained. This can be a steady state for a particular state. In step 250, the process applies the property of continuity of state to the state equations. The continuity of state dictates that the ending of one state would be the starting of the next state. For a two-state circuit, the ending of the first state would necessarily define the starting condition, $X_2$, of the second state. Therefore, information relating to the ending of a first state can be used to define the starting condition of the subsequent state. The continuity of state can occur at the transition boundary between the two consecutive states.

Next, in step 260, the algorithm finds all starting and ending conditions given the continuity of state at all transition points. In the example two-state case, both starting conditions, $X_1$ and $X_2$, are embedded in the two equations establishing continuity at transition boundaries. It is well known in algebra that two unknowns linked in two equations can be solved with no ambiguity.

Finally, step 270 determines the steady state performance of the circuit as a combination of all its matrix, components, and starting conditions obtained in step 206. That is, the steady state performance of the circuit can be estimated as a function of the dynamic circuit components of the first state and the second state.

Figure 3:
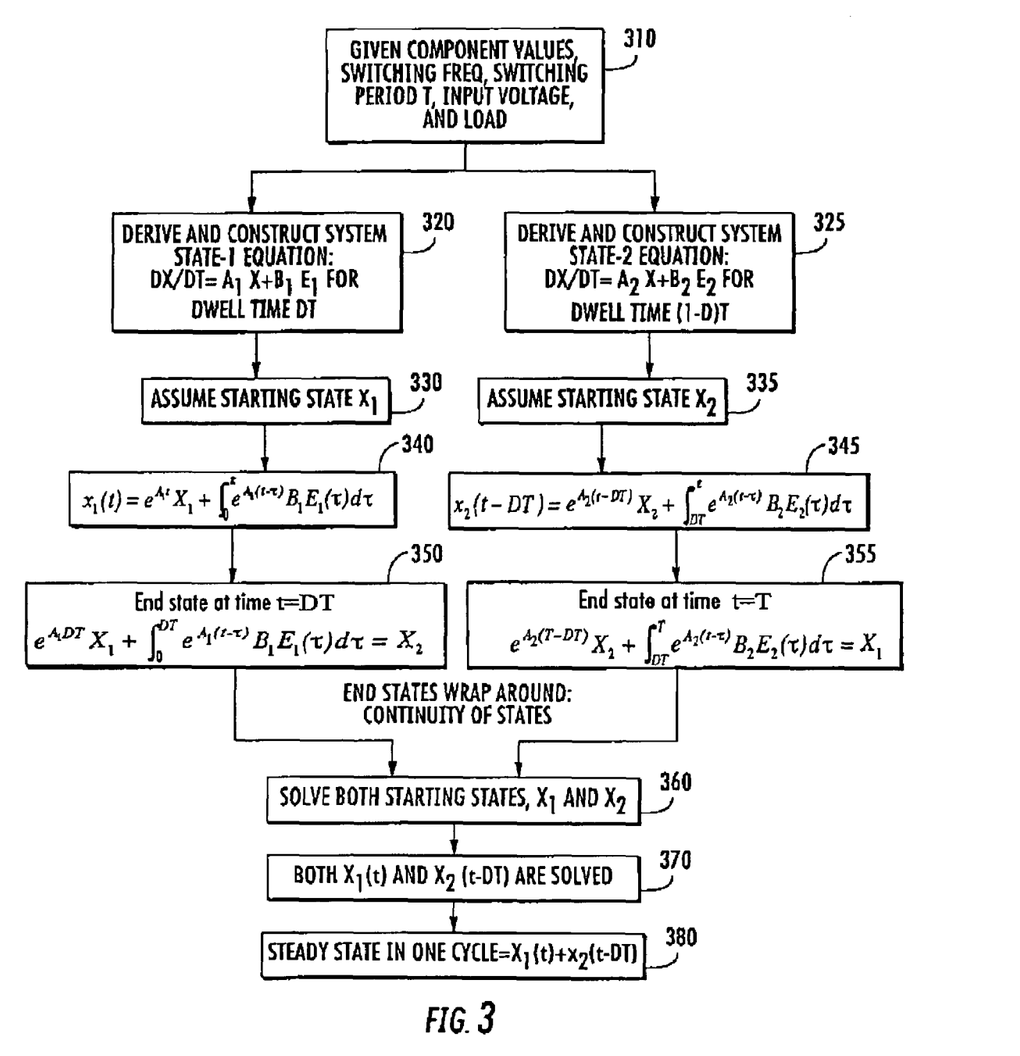
FIG. 3 is an exemplary algorithm according to another embodiment of the disclosure.

FIG. 3 is an exemplary algorithm according to another embodiment of the disclosure. As in the exemplary algorithm of FIG. 2, the algorithm shown in FIG. 3 can be implemented in an independent software associated with a hardware or it can be embedded in the processor. The exemplary process of FIG. 3 starts in step 310 by entering component values for the circuit. The components may include resistors, inductors, capacitors, transistors or any other linear or non-linear circuit component. The component values, as well as the operating conditions, including input voltage, switching frequency and loading current are known values and can be entered directly.

Assuming a two-state system, state equations for each of the first and the second state can be constructed. Specifically, step 320 and 325 define state equations for each of the first and the second states respectively. For a DC/DC converter, the state equation for the dwell time in the first state can be defined as:

$$dx/dt = A_1 x + B_1 E_1 \quad (1)$$

In equation (1), lower case x can define a state vector representing inductor currents and capacitor voltages and $A_1$ can define the transition matrix in the first state during dwell time DT, where D is the time-fraction of dwell per period T. For a DC/DC circuit having various components, elements of $A_1$ can represent interactions of structure as multiple first-order, cross-coupled differential equations. Matrix $B_1$ describes the way input energy $E_1$ enters the circuit in state 1.

Step 325 defines a similar state equation for state 2 and for the dwell time (1-D)T as:

$$dx/dt = A_2 x + B_2 E_2 \quad (2)$$

Next, the algorithm assumes a starting condition X. The upper case X stands for the cyclic starting conditions of state vector x. This assumption is represented for each state in steps 330 and 335. Once a starting condition is assumed, steps 340 and 345 determine the circuit's response given the starting condition and the corresponding circuit structure. For example, step 340 defines the structure response $x_1(t)$ for the first state as:

$$x_1(t) = e^{A_1 t} X_1 + \int_0^t e^{A_1(t-\tau)} B_1 E_1(\tau) d\tau \quad (3)$$

Equation (3) can be integrated between the integration limits of 0 and DT as shown in step 340. Similarly, step 345 defines the structure response $x_2(t)$ for the second state as:

$$x_2(t - DT) = e^{A_2(t-DT)} X_2 + \int_{DT}^t e^{A_2(t-\tau)} B_2 E_2(\tau) d\tau \quad (4)$$

Equation (4) can be integrated between the integration limits of DT and T as shown in step 345 of the algorithm. In steps 350 and 355, the continuity of states is applied at the transition boundaries. The transition boundary of state 1 occurs at t=DT, where equation (3) results in $X_2$ and written as (see step 350):

$$e^{A_1 DT} X_1 + \int_0^{DT} e^{A_1(t-\tau)} B_1 E_1(\tau) d\tau = X_2 \quad (5)$$

Equation (3) can be integrated between the integration limits of 0 and DT as shown in step 350 of the algorithm. Since the transition boundary of state 2 occurs at t=T, Equation (4) results in $X_1$ and written as:

$$e^{A_2(T-DT)} X_2 + \int_{DT}^T e^{A_2(t-\tau)} B_2 E_2(\tau) d\tau = X_1 \quad (6)$$

Equation (4) can be integrated between the integration limits of T and DT as shown in step 355. Since the circuit is assumed to have two states and the states wrap around (see FIG. 2), the end state $X_2$ would end up as the start state $X_1$. Consequently, equations (5) and (6) can be simultaneously solved to determine $X_1$, $X_2$, and in turn $x_1(t)$ and $x_2(t-DT)$. The steady state in one cycle can be determined according to the following relationship (step 380):

Steady state in one cycle=$x_1(t)+x_2(t-DT)$ \quad (7)

The steps illustrated in the exemplary algorithm of FIG. 3 can be implemented in a software in communication with one or more processors and database(s). The algorithm may also be imbedded in hardware to provide a firmware. The firmware can be in communication with a database. Additionally, the firmware may receive input from an operator or from a database identifying circuit variables, such as, switching frequency, switching period, input voltage, load, component values and operating conditions. The algorithm can then determine the steady state performance of the circuit in real time and report back to the operator in significantly shorter time than the conventional methods.

While the disclosure has referenced a two-state system for simulation purposes, it should be noted that the principles disclosed herein are not limited to a two-state system and can be readily applied to multi-state systems to obtain similar results. As it will be readily apparent to one of ordinary skill in the art, the steady state equations for a tri-state system, for example, will entail a more complex calculation.

Figure 4:
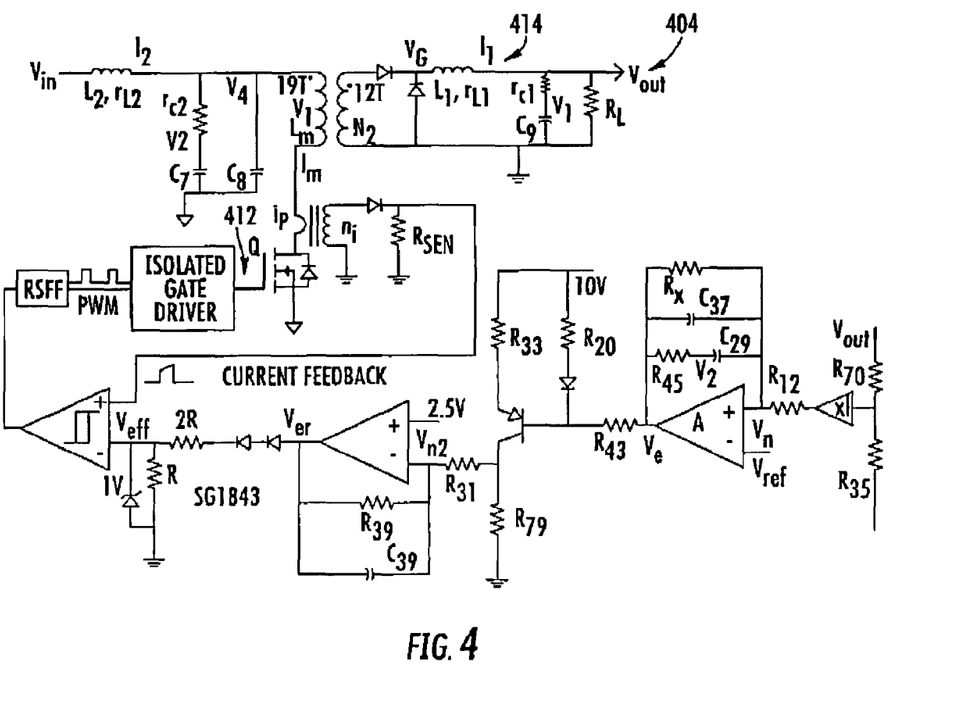
FIG. 4 is a circuit diagram for a conventional DC-DC switching converter.

FIG. 4 is a circuit diagram for a conventional DC-DC switching converter. The circuit of FIG. 4 is conventional and therefore its components will not be discussed in detail. Referring to FIG. 4, input voltage is $V_{in}$ and output voltage is $V_{out}$. Isolated gate drivers and switch 412 activate/deactivate the system. Switch 412 can be a MOSFET-type switch. Given the state of switch 412, the converter cycles between two structures (or states): the On- and Off-configurations. Transition matrix $A_1$ can define the On-configuration and transition matrix A2 can define the Off-configuration. A source matrix B can also be identified.

An exemplary method for determining elements for matrix $A_1$, $A_2$ or B will be provided with reference to the exemplary embodiment of FIG. 4. In FIG. 4, ten state variables consisting generally of inductor currents and capacitor voltages and corresponding to the lower case x of equation (1), or (2), are identified. A first-order differential equation can be established for each state variable and an output equation can also be formulated in terms of given state variables. For instance, the output, $v_o$, can be expressed as:

$$v_o = \left(\frac{r_{c1} \cdot R_L}{r_{c1} + R_L}\right) i_1 + \left(\frac{R_L}{r_{c1} + R_L}\right) v_1 \quad (8)$$

In equation (8) $i_1$ is the current through inductor $L_1$ while $v_1$ the voltage across $C_9$. Given the output equation, a differential equation around the output loop containing inductor $L_1$, series resistance $r_{L1}$, the driving source, and the output node can be written as:

$$L_1 \frac{di_1}{dt} + r_{L1} \cdot i_1 = v_g - v_o \quad (9)$$

By plugging in the output equation and regrouping terms according to state variables, the differential equation (9) can be rewritten as:

$$\frac{di_1}{dt} = \left[-\frac{r_{i,1} + \frac{r_{c1} \cdot R_L}{r_{c1} + R_L}}{L_1}\right] i_1 + \left[-\frac{\frac{R_L}{r_{c1} + R_L}}{L_1}\right] v_1 + \frac{v_g}{L_1} \quad (10)$$

where the quantities in bracket are the first row elements for transition matrix $A_1$, or $A_2$, depending on the dwell time. By a similar procedure, the second differential equation and its row elements corresponding to the state variable $v_1$ can also be described as $$\frac{dv_1}{dt} = \left[\frac{R_L}{(r_{c1} + R_L)C_9}\right] i_1 + \left[-\frac{1}{(r_{c1} + R_L)C_9}\right] v_1 \quad (11)$$

It is noted that the embodiment of FIG. 4 is exemplary in nature and the principles disclosed herein can be applied to any circuit with any number of operating states. The three matrixes, $A_1$, $A_2$ and B enable calculating $X_1$ and $X_2$ consistent with the embodiments of the disclosure. Once $X_1$ and $X_2$ are determined, the steady state waveform for all circuit nodes can be determined.

Figure 5A:
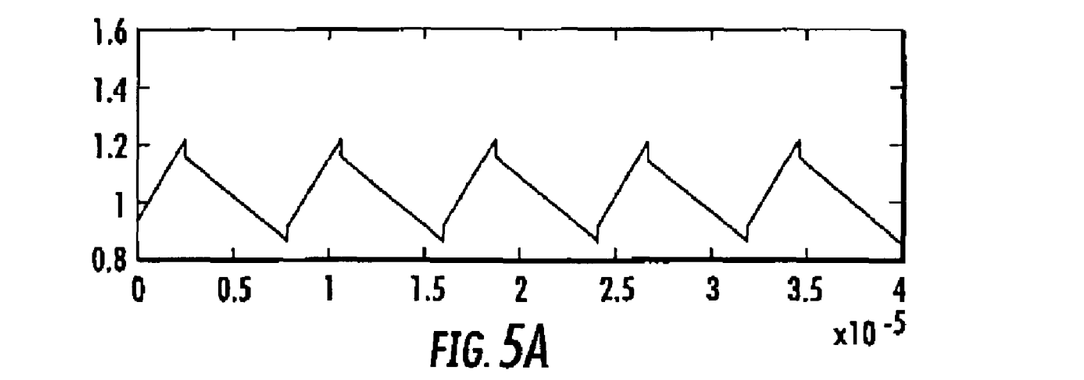
FIG. 5A is a graphic illustration of the steady state prediction for inductor current of the circuit shown in FIG. 4.

Using an algorithm consistent with the disclosure, the predicted and actual actuation converter measurements were plotted for the circuit of FIG. 4. FIG. 5 is a graphic illustration of the predicted converter current output for the circuit shown in FIG. 4. Specifically, FIG. 5A shows the predicted inductor ($L_1$, FIG. 4) current 414 at the output stage.

Figure 5B:
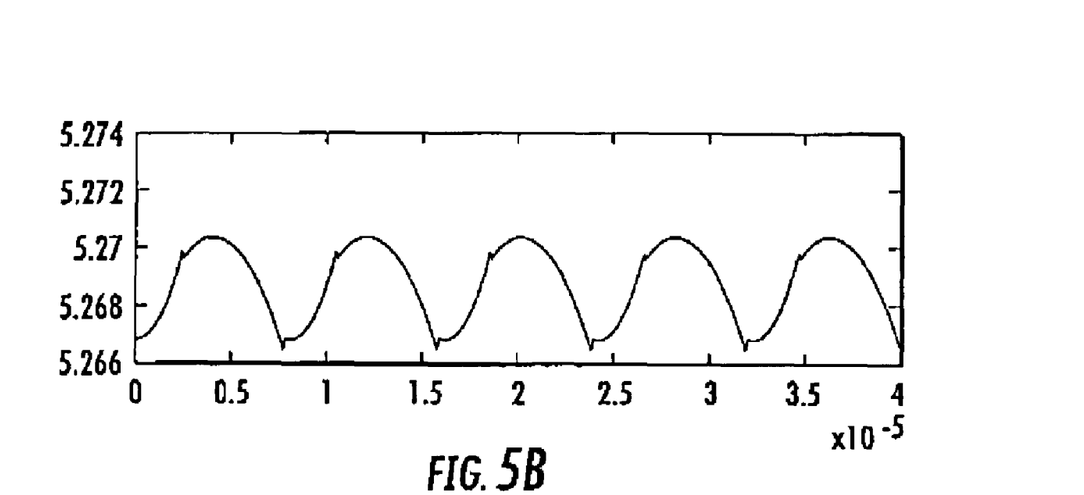
FIG. 5B is a graphic illustration of a predicted steady state output voltage ($V_{out}$) for the circuit of FIG. 4.

FIG. 5B shows the predicted converter output voltage 404 (see $V_{out}$ in FIG. 4). It can be seen from FIGS. 5A and 5B that the predicted inductor current cycles between 0.9 to 1.2 Amp, while the predicted voltage output cycles, at steady state, at about 5.300 volt. The simulation time for this experiment took only four to five seconds to produce the steady state which is a significant improvement over the conventional methods.

Figure 5C:
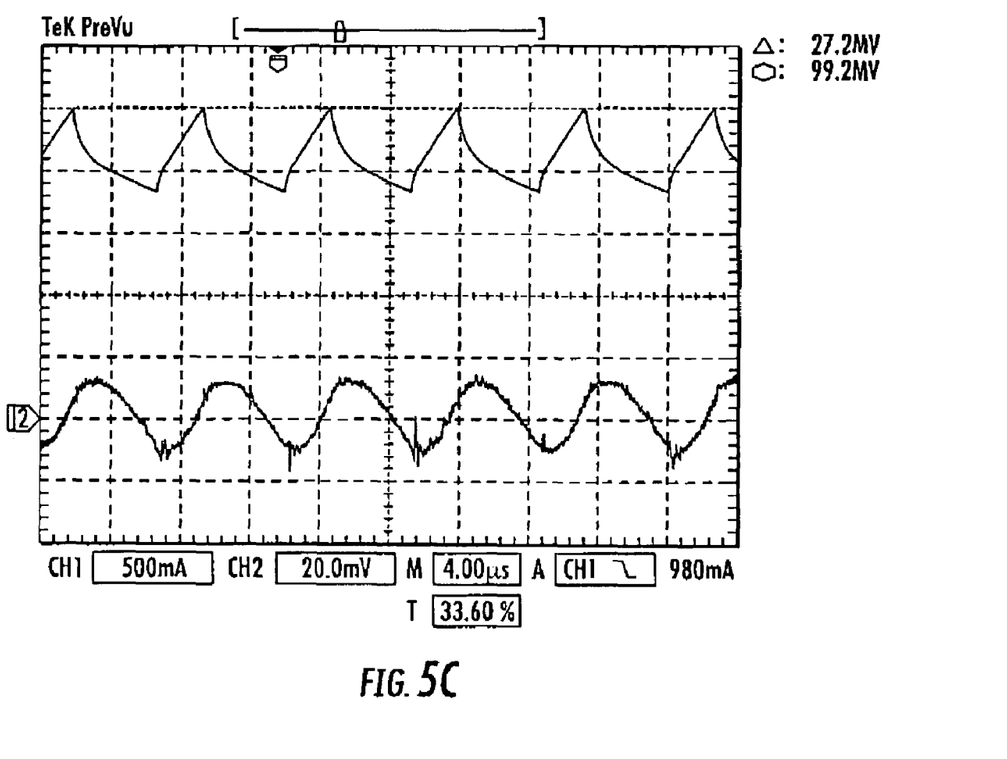
FIG. 5C shows the actual converter measurements for the circuit of FIG. 4 at steady state.

FIG. 5C shows the actual converter measurements for the circuit of FIG. 4. In FIG. 5C, the actual inductor 414 current ($I_{L1}$) is shown on top and the actual voltage output $V_{out}$ 404 ripple is shown on the bottom of the chart. From FIGS. 5A, 5B and 5C, it can be readily seen that the steady state prediction according to the embodiments disclosed herein can provide fast and accurate prediction.

Figure 6:
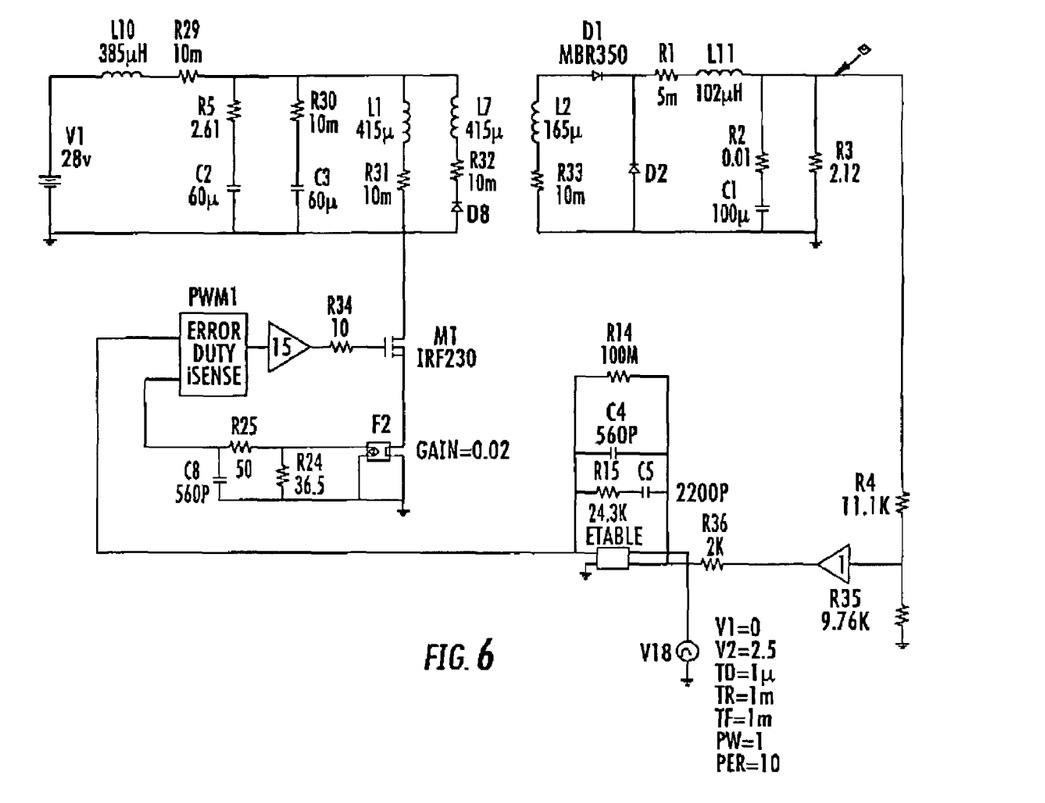
FIG. 6 is a simplified circuit file for a DC/DC converter similar to that of FIG. 4.

In order to compare the predicted steady state according to an embodiment disclosed herein with the conventional methods, a conventional software was programmed corresponding to a simplified circuit similar to the converter of FIG. 4. FIG. 6 shows a simplified simulation circuit for a DC/DC converter similar to that of FIG. 4 which was used with a conventional simulation program. The circuit components of FIG. 6 are conventional and therefore will not be discussed in detail. For a 10 ms observation time including turn-on transient, the conventional simulation software took about 10 minutes to complete its prediction.

Figure 7:
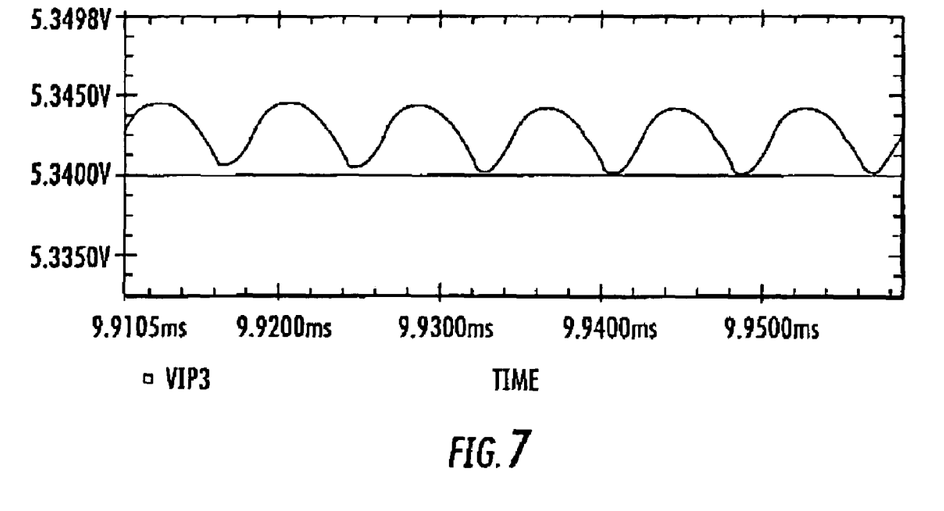
FIG. 7 is a graphic illustration of the predicted output voltage ($V_{out}$) for the simplified circuit of FIG. 6 using a conventional simulation program.

FIG. 7 is a graphic illustration of the predicted output voltage ($V_{out}$) for the simplified circuit of FIG. 6 using a conventional simulation program. The conventional simulation program took over 10 minutes to produce the steady state prediction waveform of FIG. 7. The simulation waveform of FIG. 7 shows that it has not yet reached steady state as evident with reference to a constant voltage 5.340 V. A longer observation time of 50 ms, again including turn-on transient, was conducted. The simulation time was-about 30 minutes. However, the output voltage still failed to reach steady state of 5.300 volt.

Compared with the embodiments disclosed herein, the conventional simulation programs had the following shortcomings: (1) very long simulation time; (2) output did not reach steady state thereby leaving the results questionable; (3) to enable complete simulation without failure, circuit model and several component values had to be adjusted which rendered the simulated circuit inconsistent with the actual circuit; (4) the effects of load change also required prolong simulation time and suffered from the same deficiencies; (5) the conventional simulations had a high risk of convergence failure in the course of transient settling; (6) the conventional simulation programs required human intervention to view the analysis results in detail; and (7) the conventional simulation programs required more manual processing for harmonic or power evaluations.

In contrast, the methods disclosed herein enable re-computing $X_1$, $X_2$ and system state variables, given new $A_1$ and $A_2$ matrixes. Moreover, the embodiments disclosed herein can provide a predicted behavior almost immediately, depending on the complexity of the circuit. Since there is no transient state involved in the disclosed algorithms, there is no risk of convergence issues and computation time is consistently in the order of 2-3 second for each new operating conditions. In one embodiment, the power dissipation, harmonic studies and other evaluations can be included in a database or a source file for future reference. Thus, the embodiments disclosed herein do not require additional human intervention or post processing assessments.

The above description is not intended and should not be construed to be limited to the examples given but should be granted the full breadth of protection afforded by the appended claims and equivalents thereto. Although the disclosure is described using illustrative embodiments provided herein, it should be understood that the principles of the disclosure are not limited thereto and may include modification thereto and permutations thereof.

What is claimed is:

1. A method for predicting a steady state performance of a switched circuit having a first operating state and a second operating state, the method comprising:
    identifying a plurality of circuit components, each circuit component having at least one parameter;
    determining a first state transition matrix [$A_1$] and a second state transition matrix [$A_2$];
    defining a first state sourcing matrix [$B_1$] and a second state sourcing matrix [$B_2$];
    defining a first energy input matrix [$E_1$] for energy input to the switched circuit during the first state and a second energy input matrix [$E_2$] for energy input to the switched circuit during the second state;
    defining a first state equation and a second state equation as a function of a dwell time in the first state;
    equating the end condition of the first state to the starting condition of the second state and equating the end condition of the second state to the starting condition of first state;
    obtaining a starting condition; and
    predicting the steady state performance of the switched circuit as a function of the first and the second state equations and the starting condition.

2. The method of claim 1, wherein the at least one parameter defines a value characterizing one of the plurality of circuit components.

3. The method of claim 1, wherein the plurality of circuit components comprises capacitors, inductors, transistors and switching frequency.

4. The method of claim 3, wherein the switching frequency is a variable.

5. The method of claim 3, wherein the switching frequency is a constant.

6. The method of claim 1, wherein the first energy matrix [$E_1$] defines at least one of an input voltage or an input current to the switched circuit at the first state.

7. The method of claim 6, wherein the input voltage is variable within a range.

8. The method of claim 1, wherein the switched device is a converter.

9. The method of claim 1, further comprising predicting the steady state performance of the switched circuit without regard to the transition state between the first state and the second state.

10. An apparatus for predicting a steady state performance of a multi-state switched device operating in a first state and a second state, the apparatus comprising at least one microprocessor in communication with a memory, the memory storing instructions for directing the microprocessor to:
    identify a plurality of circuit components of the switched device, each component having at least one parameter;
    determine a component matrix for the first state [$A_1$] and a component matrix [$A_2$] for the second state;
    define a first state source matrix [$B_1$] and a second state source matrix [$B_2$], the first state source matrix defining the switched devices weight to an input at the first state and the second state source matrix [$B_2$] defining the switched devices weight to an input at the second state;
    determine a first energy input matrix [$E_1$] defining energy input to the switched device during the first state and a second energy input matrix [$E_2$] defining energy input to the switched device during the second state;
    determine a first state equation and a second state equation as a function of a dwell time in the first state; and
    predict the steady state performance for the switched device as a function of the first state and the second state equations.

11. The apparatus of claim 10, wherein the at least one parameter defines a value characterizing one of the plurality of circuit components.

12. The apparatus of claim 10, wherein the plurality of circuit components comprises capacitors, inductors, transistors and switching frequency.

13. The apparatus of claim 12, wherein the switching frequency is a variable.

14. The apparatus of claim 12, wherein the switching frequency is a constant.

15. The apparatus of claim 10, wherein the first energy matrix $[E_1]$ defines at least one of an input voltage or an input current to the first state.

16. The apparatus of claim 15, wherein the input current is variable within a range.

17. The apparatus of claim 10, wherein the switched device is a converter.

18. The apparatus of claim 10, further comprising determining the steady state performance of the switched device without regard to the transition state between the first state and the second state.

19. The apparatus of claim 10, wherein the instructions further comprise: comparing the predicted steady state performance and the expected steady state performance for the switched circuit.

20. A firmware for predicting steady state performance of a multi-state switched device, comprising a microprocessor programmed with a set of instructions to:
   identify a plurality of circuit components for the switched device, each component having at least one parameter;
   determine a component matrix for a first state $[A_1]$ and a component matrix $[A_2]$ for the second state, the first state and the second state defining the operating states of the multi-state switched device;
   define a first state source matrix $[B_1]$ and a second state source matrix $[B_2]$, the first state source matrix defining the switched devices weight to an input at the first state and the second state source matrix $[B_2]$ defining the switched devices weight to an input at the second state;
   determine a first state equation and a second state equation as a function of a dwell time in the first state; and
   predict the steady state performance for the switched device as a function of the first state and the second state equations without regard to a transition state between the first and the second states.

21. The firmware of claim 20, wherein the at least one parameter defines a constant value characterizing the one of the plurality of circuit components.

22. The firmware of claim 20, wherein the plurality of circuit components comprises capacitors, inductors, transistors and switching frequency.

23. The firmware of claim 22, wherein the switching frequency is variable.

24. The firmware of claim 22, wherein the switching frequency is constant.

25. The firmware of claim 20, wherein the switched device is a converter.

26. The firmware of claim 20, wherein the first state response defines the switched device's response to an energy input at the start of the first state.

27. The firmware of claim 20, further comprising determining the steady state performance of the switched device without regard to the transition state between the first state and the second state.

* * * * *